United States Patent [19]
Berkhan

[11] 3,720,470
[45] March 13, 1973

[54] APPARATUS AND METHOD FOR OPTICAL DETERMINATION OF PARTICLE CHARACTERISTICS

[75] Inventor: Ernst Berkhan, Gottingen, Germany

[73] Assignee: Phywe Aktiengesellschaft Gottingen, Gottingen, Germany

[22] Filed: Aug. 16, 1971

[21] Appl. No.: 171,915

[30] Foreign Application Priority Data

Oct. 15, 1970  Germany.....................P 20 50 672.3

[52] U.S. Cl. ..................356/102, 356/103, 356/181, 250/218
[51] Int. Cl. .......G01n 15/02, G01n 21/00, G01j 3/46
[58] Field of Search ......250/218; 356/102, 103, 104, 356/181

[56] References Cited

UNITED STATES PATENTS 2,732,753  1/1956  O'Konski..........................250/218 X
2,731,877  1/1956  Clamann ..........................250/218 X Primary Examiner—Ronald L. Wibert
Assistant Examiner—Conrad Clark
Attorney—D. C. Roylance, Robert H. Berdo, Walter C. Farley, David S. Abrams and Donald A. Kaul

[57] ABSTRACT

A shallow chamber is provided for passing through it a stream which envelopes a capillary stream of the particles, the characteristics of which are to be determined. The particles are in suspension in this capillary stream, which moves over the lower wall of the shallow chamber. At least one wall of the flow-through chamber is transparent and is arranged so that the focal area of the observing microscope coincides with the depth of the capillary stream.

8 Claims, 5 Drawing Figures

PATENTED MAR 13 1973 3,720,470

INVENTOR
ERNST BERKHAN

BY Nolte & Nolte

ATTORNEYS

APPARATUS AND METHOD FOR OPTICAL DETERMINATION OF PARTICLE CHARACTERISTICS

BACKGROUND AND NATURE OF THE INVENTION

One of the methods presently used for observing particle characteristics and for example for counting blood cells, utilizes an aperture member of small clear diameter which the particles, moving in suspension, pass one after the other. In order to pass the particles through the center of the aperture, for exact measurement of the particle volume, there is used an enveloping stream, and injection of the particles into the center of the opening. This system allows observation of particles by electrical signal.

In optical systems for similar purposes the aperture is illuminated and a photoelectric detector measures the intensity of the light behind the aperture. This system does not allow exact measurement of particle size as the optical signals also depend on the location of particles in the aperture and on their various paths. The latter problem is also encountered when particles are observed by optical response to their light scattering or fluorescence. In addition, the latter methods are complex, expensive and nevertheless of limited precision for a number of reasons, including the fact that they require lateral deflection of the particle suspension in front of the microscope objective, which causes unsymmetrical particle paths with respect to directions of illumination and observation. All these systems also tend to cause clogging of the narrow aperture by relatively large particles carried in the suspension.

It has also been proposed to illuminate and observe the particles in directions normal to their motion. In such systems the suspension has been passed through a capillary tube. Moreover, it has been proposed to replace the capillary tube by an enveloping stream into the center of which the particle suspension is injected. If suitable dimensions and velocities are used the particles generally stream through a cylindrical region of small cross-section, thereby avoiding disturbance by limiting walls, which is otherwise encountered. However, systems of these types have been of limited use, particularly when fluorescent light is to be used in the optical system. The microscope objectives suitable for such observation have high aperture and correspondingly limited depth of focus, usually only a very few microns, which must reach all particle paths during the measurement. However, in enveloping stream systems used and described thus far, some particles always have motions with components normal their general paths, whereby they are carried far out of the focal range of such objectives.

The invention overcomes the problem which has been outlined. It allows precise optical measurement of particle characteristics in a stream. It also allows successive measurement of different particles. It avoids the failure of optical observation of some or many particles, caused by the aforementioned problems.

For these purposes the invention uses a shallow observation chamber wherein a particle stream of capillary depth is moved along one wall of the chamber by an enveloping stream which holds the particle stream at fixed distance from the microscope objective with a minimum of transverse motion and disturbance. The focal depth of the objective substantially coincides with the capillary depth of the particle streams. Clogging of a capillary tube is safely avoided.

In the drawing

DETAILED DESCRIPTION

Figure 1:
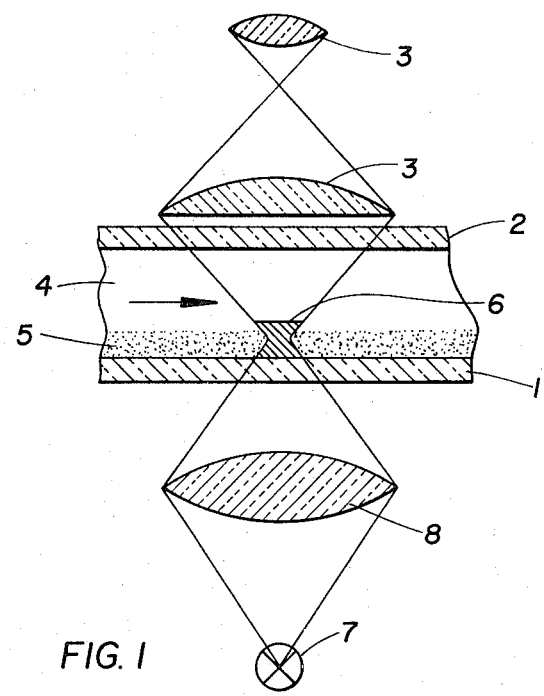
FIG. 1 is schematic cross-sectional view of a first embodiment of this invention.

FIG. 1 shows a system according to the invention wherein the shallow chamber is formed by transparent bottom wall 1 and transparent top wall 2, both advantageously consisting of plane and smoothly ground glass with surfaces normal to the axis of the observing microscope 3, the objective of which closely overlies the top wall, and the focal distance of which approximately coincides with the depth of the chamber above bottom 1. The width of the chamber can be same as or larger than the depth thereof. Envelope stream 4 has particle stream 5, which it surrounds and moves in the direction of the arrow. The depth of particle stream 5 is of capillary dimensions and substantially coincides with the depth of sharp focal definition of microscope 3, which depth is approximately defined by shaded area 6. Light source 7 and condensing lens 8 illuminate the particle stream.

The arrangement allows precise optical observation of particle characteristics, as the suspension of particles passes the measuring area exclusively within the reach or depth of focus of the observing microscope. In particular, the arrangement contrasts with earlier systems in that it allows exact measurement of light absorption by particles with the aid of suitable means (not shown) for measurement of intensity of the light which passes the particle stream. The microscope system can be shifted freely in the direction of the stream, without impairment of precision of measurement, as constant measuring conditions can be maintained with respect to such factors as the distance between the particle suspension and the microscope objective, illumination of the suspension, velocity of particles and width of the stream. Adjustments are not nearly as critical as they were in former systems.

Nor are difficulties to be expected by accumulation of dirt on cover plate 2, as this plate is contacted only by the liquid free of particles. Nor can the chamber be clogged by larger particles as it has constant cross-sections. Particle dimensions need not be limited to the depth of the particle suspension.

The observing chamber 1, 2 desirably has a depth equal only to fractions of a millimeter and the depth of particle stream 5 in turn is only a fraction of the total depth. In such arrangement, parallel motion of the particle suspension in particle free liquid is easily achieved as the flow can be kept purely laminar and non-turbulent. The Reynolds number for typical liquids used in this system — preferably aqueous solutions — is about 500 when the flow velocity is 5 meters per second and the chamber has a depth of 0.1 millimeter. This value of 500 is safely below the critical value of 2300.

It will be seen that the position of the stream of a particle suspension, relative to the focal depth of the microscope, is fixed by bottom wall 1 in FIG. 1, while the enveloping stream of particle free liquid, flowing in a laminar flow, prevents particles from moving out of the area of focal depth. While enveloping and particle carrying liquids should be miscible in order that the latter can be entrained by the former, at laminary velocities, nevertheless the particles, at such velocities, do not move from the particle stream into the enveloping stream, particularly when the particles are of the type observed in typical measuring methods, considered herein, which include for example blood particles, healthy body cells, tumor cells and the like.

Figure 2:
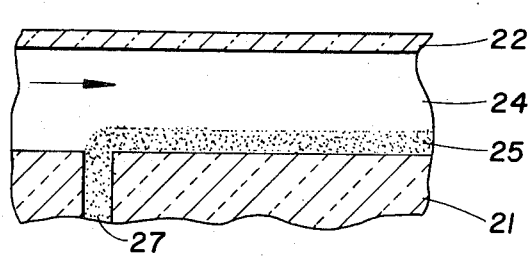
FIGS. 2 and 3 are generally similar but partial views of second and third embodiments of the invention.

Referring now to FIG. 2, it is shown here how the particle suspension is brought into the particle free liquid, ahead of the measuring area. In this example, bottom wall 21 has a side inlet 27 through which a stream of particle suspension 25 enters the stream 24 of enveloping liquid. Walls 21, 22 of this system can be integral with walls 1 and 2 of FIG. 1, respectively, although this is not absolutely necessary. The form of aperture 27 and its diameter in the direction of enveloping stream 24 are not critical, so that the attachment can be produced simply and inexpensively. In a direction across the stream, the diameter of aperture 27 should equal the diameter of the following, illuminated observation area below the microscope objective. The particle suspension 25 then is limited both laterally and at the top by particle free liquid 24. It may be noted at this point that illustrations are schematic and that usually the diameter of the illuminated microscopic observation area is large relative to the focal depth and suspension depth (often 10 times larger), so that lateral fixation of the particle suspension by a fixed wall is not needed. Should the particle flow fail to have its centerline exactly cross the optical axis of the microscope, this hardly influences the precision of measurement, whereas, as mentioned above, changes of distance along the axis of the objective cause enormous disturbance.

Figure 3:
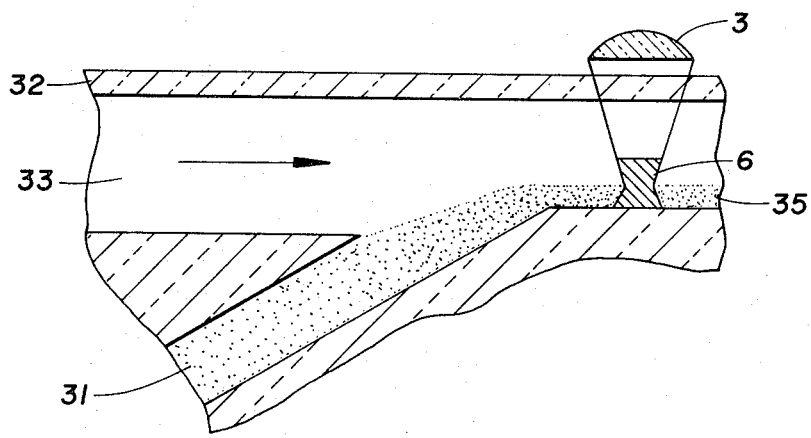

As shown next in FIG. 3, this modified cross-section diagram schematically shows a system using relatively large apertures for introduction of the particle suspension, with continuous reduction of channel area between this aperture and the measuring region. This arrangement further reduces the danger of clogging. In this system, element 31 represents a relatively large side channel for suspension joining an even larger channel 33 for enveloping liquid, both leading to the small and shallow chamber for particle stream 35 to be observed.

Figure 4:
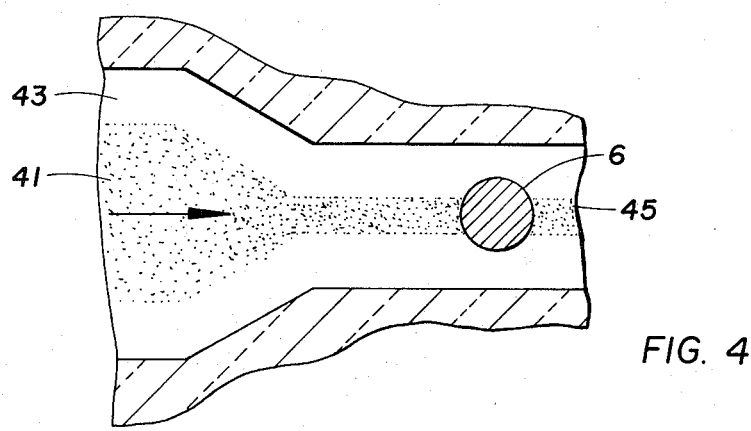
FIG. 4 is a plan view of a fourth embodiment.

The system of FIG. 3 or any other suitable feed system may have the form, in plan view, which is shown in FIG. 4. Here the aperture of the feed channel for the particle suspension can be made wide enough to produce, pursuant to continuous reduction in which, a particle stream 45 of desired width, slightly narrower than observation area 6.

Figure 5:
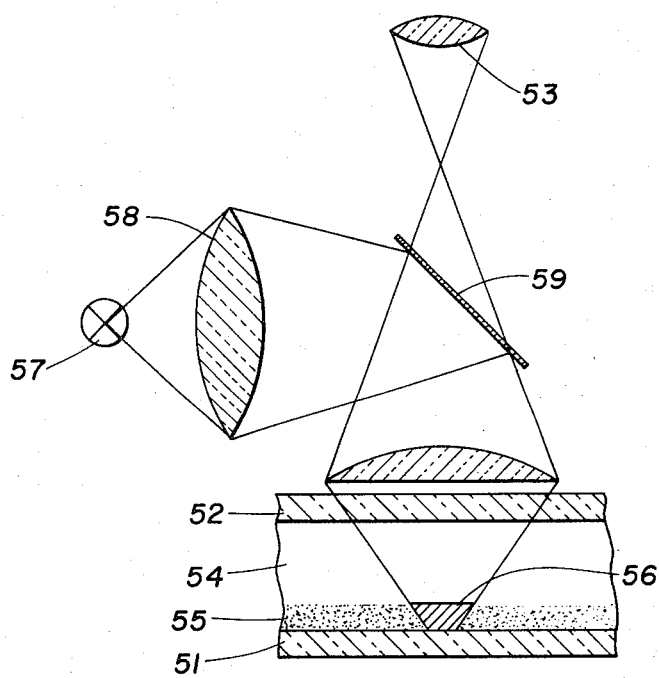
FIG. 5 is a view generally similar to FIG. 1 but showing the use of a different optical system.

Finally, FIG. 5 shows a modification of the optical system and corresponding possible modification of the observation chamber, according to the coincident top lighting method. In this case, bottom wall 51 can be opaque. Illuminating system 57, 58 illuminates particle stream 55, with focal depth 56, by means of a half mirrored plate 59 inserted between ocular and objective of the observing microscope 53.

What is claimed is:

1. An apparatus for the optical determination of characteristics of particles in a suspension, comprising:
   a shallow chamber having at least one planar wall;
   means for passing a flow of the suspension into said chamber;
   laminar liquid flow means for entraining the suspension as a particle flow of capillary depth and for moving the particle flow along and in contact with the planar wall; and
   microscope means for observation of the particle flow,
   said microscope means having a focal depth approximately coincident with said capillary depth.

2. Apparatus according to claim 1, wherein said wall is the bottom of said chamber.

3. Apparatus according to claim 1, wherein said microscopic means overlies said chamber.

4. Apparatus according to claim 1, additionally including means for illuminating said particle flow in the region of focal depth.

5. Apparatus according to claim 4, wherein the illuminating means is disposed opposite the microscope means, with said chamber between them.

6. Apparatus according to claim 4, wherein the illuminating means is disposed on the same side of said chamber as the microscope means, with semi-reflective means for coincident illumination.

7. Apparatus according to claim 1, wherein said chamber has constantly reduced cross-sections ahead of the zone of focal depth.

8. A method of optical determination of characteristics of particles in a suspension, comprising the steps of:
   maintaining a laminar flow of liquid through the inside of a chamber;
   entraining a flow of the suspension as a particle flow of capillary depth with the flow of liquid so that the particle flow is in contact with the inside of the chamber; and
   observing the particle flow in an optical system having a focal depth approximately coincident with the capillary depth of the particle flow.

* * * * *